April 18, 1950  R. C. TOBIAS  2,504,282
BIRD FEEDER
Filed Nov. 29, 1946

Inventor
ROSCOE C. TOBIAS
By McMorrow, Berman & Davidson
Attorneys

UNITED STATES PATENT OFFICE 2,504,282

BIRD FEEDER

Roscoe C. Tobias, Aurora, Ill.

Application November 29, 1946, Serial No. 712,771

1 Claim. (Cl. 119—51)

This invention relates to bird feeders and more particularly of a type of bird feeder wherein the food will be automatically made available as portions thereof are eaten away.

It is an object of the present invention to provide a bird feeder in which the food is always within reach of the birds, yet while being retained through means of a wire mesh and wherein the wire mesh is backed up by a strong spring, holding wire mesh against the food and serving to move the wire mesh in the direction of the food as the outer portions of the food are eaten away.

It is another object of the present invention to provide a simple arrangement for retaining the food adapted to be attractive to birds in which the parts are easily adjustable and wherein the frame which retains the food is place has on it the perch and thus as the food retaining mesh is moved forwardly toward the food the perch likewise will be moved so that the bird while on the perch is always the same distance from the food regardless of how much of the food has been eaten away.

For other objects and for a better understanding of the invention, reference may be had to the following detailed description taken in connection with the accompanying drawings, in which.

Figure 1:
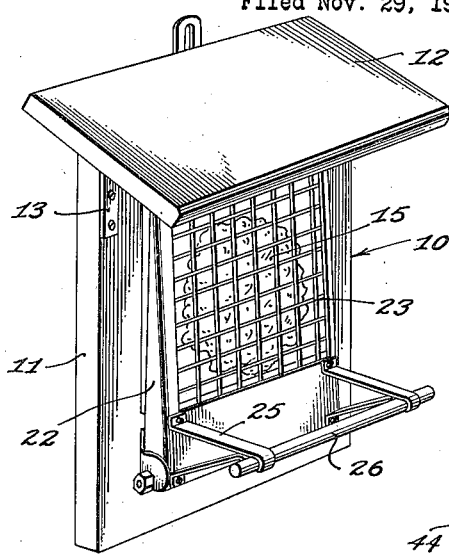
Figure 1 is a perspective view of one form of the invention looking upon the front of the same and showing the wire mesh in place over the suet or other food adapted to be retained by the bird feeder, the mesh frame having a perch adapted to follow on with the mesh frame as it moves into the food.

Referring to the figures, there is shown a bird feeder 10 formed from a vertically extending board 11 and a top hood 12 extending outwardly from the top edge of the vertically extending member 11. The hood 12 provides a shelter for the top of the feeder. This hood may be retained by angle brackets 13 on the top of the vertically extending member 11. On the front of the member 11 there is projected a flat, food-retaining area 14 against which food such as suet 15 is compressed. Below the projection 14 is a hinge plate 16 secured to the face of board 11 below the projected food-retaining area 14 by suitable means such as conventional wood screws and having side ear projections 17 adapted to receive a hinge pin 18. On this hinge pin is a coil spring 19 anchored as indicated at 20 to the plate 16. Pivoted for downward swinging movement upon the hinge pin 18 is a wire mesh retaining frame 22 having a wire mesh 23 therein. The other end of the spring 19 is anchored at 24 to the mesh frame 22 and is adapted so that it will tend to draw the mesh frame 22 upwardly and against food 15 on the projecting, food-retaining area 14. Extending forwardly from the lower portion of the outer face of the mesh frame and at respectively-opposite sides thereof are two brackets 25 which support a perch 26. The perch 26 is thus rigidly retained upon the mesh frame 22 and serves as a handle for moving the mesh frame against the force of spring 19.

Figure 2:
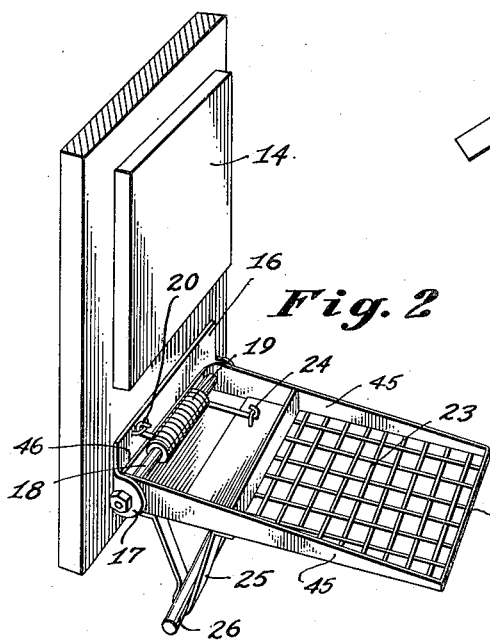
Figure 2 is a perspective view of the bird feeder shown in Figure 1 with the mesh drawn down to receive the food and to show the spring which is used for urging the mesh into the food.

When the mesh frame 22 is withdrawn to the position shown in Figure 2 and retained in this position the food can be disposed upon the mesh 23. The perch 26 will serve as a handle for urging the mesh frame 22 downwardly against the action of the spring 19. As the food is eaten away by the birds, the spring will cause the mesh frame 22 to move forwardly into the food whereby the birds when upon the perch 26 will always be the same distance from the food and it will never be inaccessible to them. In other words, the food placed in the feeder is always within reach of the birds which is made possible by means of the strong spring causing the wire mesh to follow the food as it is eaten. Accordingly by means of my hinge and spring arrangement, the food is always in front of the bird and within reach. The mesh frame has side flanges 45 which overlie the respectively opposite edges of the projection 14 to prevent lateral displacement of the food, and a transverse flange 46 which underlies the bottom edge of the projection to prevent the food from dropping out of the feeder. Between the transverse flange and the bottom edge of the frame the frame comprises a continuous plate which protects the spring and hinge assembly.

Figure 3:
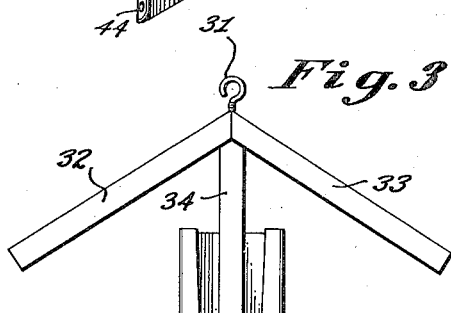
Figure 3 is an end elevational view of a modified form of the invention showing a double feeder arrangement with the pivoted mesh frames located upon the opposite sides of a vertically extending member.

Referring now particularly to Figure 3 there is shown a double feeder arrangement adapted to be suspended from a vertical point by a hook 31. There are two hoods 32 and 33 extending laterally from a central board 34. Upon opposite sides of the board 34 there is located such two arrangements as above described and as indicated at 35 and 36. With this arrangement food can be disposed upon opposite sides of a vertically extending board 34 and thus the feeder will not have to be replenished with food so often as when only one side of a board is utilized for the disposal of the food.

Figure 4:
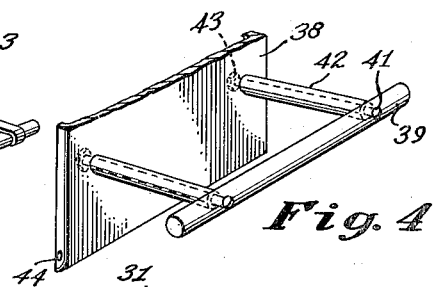
Figure 4 is a fragmentary perspective view of a modified form of perch.

Referring now particularly to Figure 4, there is shown a modified form of perch. This perch is particularly adapted where a wood or the like screen support 38 is used. A dowel 39 is connected by means of bolts 41 which extend through spacing sleeves 42 and through the board 38 for connection therewith. There are two of these bolts and two of the spacing sleeves 42 at each side of the board 38. A good and substantial perch is therefore provided and a good and substantial connection of the perch with the board 38 is also provided. The dowel perch 39 can extend to different lengths beyond the sides of the feeder.

The parts not only can be made of wood, but can be made of cast aluminum thick enough to provide a good connection of the bolts 41 therethrough. Nuts 43 connect with the inner ends of the bolts 41. The part 39 can be of different formation than the sheet metal frame 22 and will be connected by the extension of a bolt through a hole 44 extending transversely through the bottom edge of the member 38.

Having thus described my invention, I claim:

A bird feeder comprising a back board, a projection on one side of said back board providing a food-retaining area, a hinge plate secured to said one side of said back board in spaced relationship to said projection, a mesh frame pivotally connected at one end to said hinge plate, a mesh in said mesh frame having an area substantially equal to the area of said projection and positioned to overlie the latter, a spring connected between said hinge plate and said mesh frame and operative to resiliently urge said mesh toward said projection, a perch secured to said mesh frame adjacent said one end thereof and providing a handle for manual movement of said mesh away from said projection against the force of said spring, and a hood secured to said back board adjacent the top edge thereof and projecting outwardly from said one side of said back board, said mesh frame having side flanges overlying respectively-opposite edges of said projection and a transverse flange underlying the edge of said projection opposite said hood to retain food on said projection against removal except through said mesh.

ROSCOE C. TOBIAS.

REFERENCES CITED

The following references are of record in the file of this patent:

UNITED STATES PATENTS

| Number | Name | Date |
| --- | --- | --- |
| D. 146,408 | Hyde | Feb. 25, 1947 |
| 789,930 | O'Dell | May 16, 1905 |
| 884,436 | Warren | Apr. 14, 1908 |
| 992,167 | Cousin | May 16, 1911 |
| 1,229,128 | Parkhurst | June 5, 1917 |
| 1,248,893 | Nivois | Dec. 4, 1917 |
| 1,416,072 | Sopp | May 16, 1922 |
| 1,592,492 | Kelly | July 13, 1926 |
| 1,899,508 | Klein | Feb. 28, 1933 |
| 2,267,062 | Walter et al. | Dec. 23, 1941 |

FOREIGN PATENTS

| Number | Country | Date |
| --- | --- | --- |
| 11,671 | Great Britain | A. D. 1889 |
| 51,731 | Germany | Apr. 25, 1890 |
| 13,693 | Great Britain | A. D. 1899 |
| 47,550 | Denmark | July 6, 1933 |